United States Patent [19]
Nakao et al.

[11] Patent Number: 5,225,919
[45] Date of Patent: Jul. 6, 1993

[54] OPTICAL MODULATION ELEMENT INCLUDING SUBELECTRODES

[75] Inventors: Kenji Nakao, Takatsuki; Naohide Wakita, Osaka, both of Japan

[73] Assignee: Matsushita Electric Industrial Co., Ltd., Osaka, Japan

[21] Appl. No.: 718,256

[22] Filed: Jun. 20, 1991

[30] Foreign Application Priority Data

Jun. 21, 1990 [JP] Japan ................... 2-163319
Jun. 25, 1990 [JP] Japan ................... 2-167228

[51] Int. Cl.⁵ .............. G09G 3/36; G02F 1/1343
[52] U.S. Cl. ...................... 359/54; 359/56; 359/87; 340/784; 340/793
[58] Field of Search ............. 359/54, 55, 56, 87; 340/784, 793

[56] References Cited

U.S. PATENT DOCUMENTS

| | | | |
|---|---|---|---|
| 4,712,877 | 12/1987 | Okada et al. | 359/87 X |
| 4,803,536 | 2/1989 | Tuan | 357/23.7 X |
| 4,840,460 | 6/1989 | Bernot et al. | 359/74 X |
| 4,850,675 | 7/1989 | Hatanaka et al. | 359/84 X |
| 5,124,695 | 6/1992 | Green | 359/87 X |
| 5,126,865 | 6/1992 | Sayma | 359/87 |

FOREIGN PATENT DOCUMENTS

63-316024  12/1988  Japan .
90015360  12/1990  World Int. Prop. O. .

Primary Examiner—William L. Sikes
Assistant Examiner—Ron Trice
Attorney, Agent, or Firm—Wenderoth, Lind & Ponack

[57] ABSTRACT

An optical modulation element capable of displaying gradations and including common electrodes, segment electrodes and subelectrodes provided for each of the common electrodes such that each of the subelectrodes is connected to two of the common electrodes by electrical elements.

27 Claims, 9 Drawing Sheets

OPTICAL MODULATION ELEMENT INCLUDING SUBELECTRODES

BACKGROUND OF THE INVENTION

The present invention relates to an optical modulation element for use in a display unit.

Figure 10A:
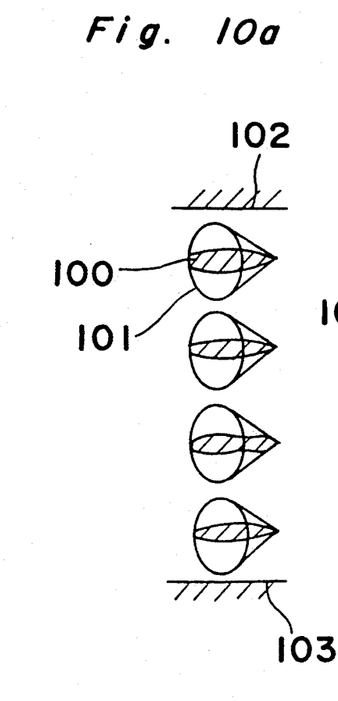
FIGS. 10a to 10c are schematic views showing molecules of a ferroelectric liquid crystal (already referred to)
Figure 10B:
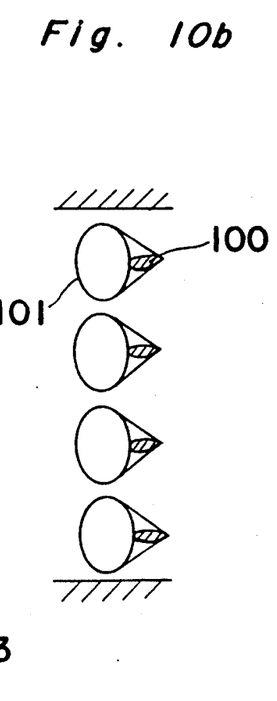
Figure 10C:
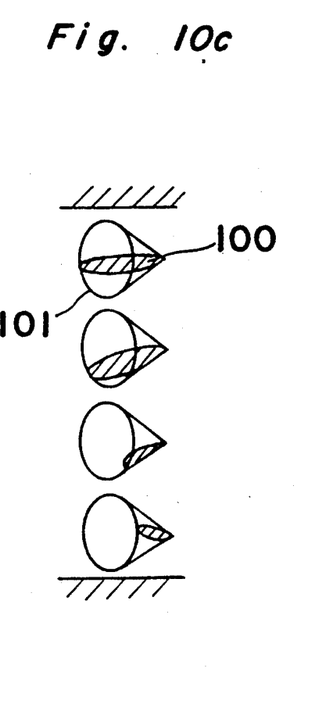

In a known ferroelectric liquid crystal panel, a ferroelectric liquid crystal formed into a thin film is interposed between opposed electrodes. At this time, several limited states of the ferroelectric liquid crystal becomes stable as shown in FIGS. 10a to 10c. In FIGS. 10a to 10c, reference numeral 100 denotes a molecule of the ferroelectric liquid crystal, reference numeral 101 denotes a cone, reference numeral 102 denotes an upper substrate and reference numeral 103 denotes a lower substrate. In FIGS. 10a and 10b, orientations of the molecules 100 of the liquid crystal are substantially uniform and spontaneous polarization of the molecules is directed upwardly or downwardly along a normal relative to the upper and lower substrates 102 and 103. In FIG. 10c, the molecules 100 of the liquid crystal are twisted in the direction of the normal relative to the upper and lower substrates 102 and 103. A direction of twist of the molecules 100 of the liquid crystal, which is opposite to that of FIG. 10c, may exist. Stable states of the molecules 100 of the liquid crystal may become different from those of FIGS. 10a to 10c according to angle of inclination of the molecules 100 of the liquid crystal relative to the upper and lower substrates 102 and 103 due to the kind of the orientation film and according the bending of the liquid crystal layer but can be schematically illustrated by FIGS. 10a to 10c basically.

Figures 11A, 11B:
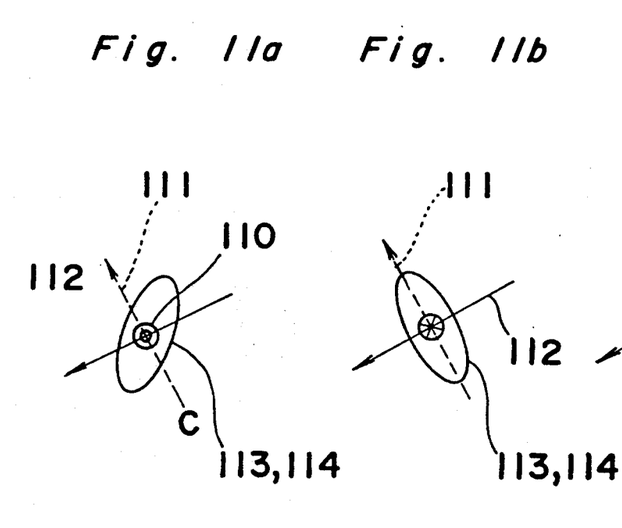
FIGS. 11a to 11c are top plan views of the molecules of ferroelectric liquid crystal of FIGS. 10a to 10c, respectively (already referred to).
Figure 11C:
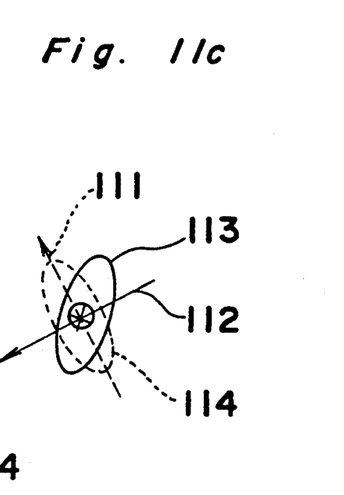

FIGS. 11a to 11c are top plan views of the liquid crystal of FIGS. 10a to 10c observed from above the upper substrate 102, respectively. In FIGS. 11a to 11c, reference numeral 110 denotes the direction of spontaneous polarization, reference numeral 111 denotes a polarizer, reference numeral 112 denotes an analyzer, reference numeral 113 denotes a molecule of the liquid crystal in the vicinity of the upper substrate 102 and reference numeral 114 denotes a molecule of the liquid crystal in the vicinity of the lower substrate 103. When a liquid crystal panel is interposed between the polarizer 111 and the analyzer 112 intersecting at right angles, FIG. 11a corresponds to a bright state and FIG. 11b corresponds to a dark state. Thus, by using these uniform states in which the molecules 113 and 114 coincide, in position, with each other, the liquid crystal panel can give bright and dark displays. In the state of FIG. 11c in which the molecules 113 and 114 deviate from each other, the liquid crystal panel gives a gray display.

The ferroelectric liquid crystal formed into a thin film has such stable states as described above and is unstable in other states. Therefore, if a voltage applied to the liquid crystal panel is increased, changes among these states occur suddenly at specific values of the voltage. Thus, relationship between the voltage applied to the liquid crystal panel and the quantity of light transmitted through the liquid crystal panel exhibits sharp threshold characteristics. If a voltage not exceeding this threshold voltage is applied to the liquid crystal panel, the liquid crystal is kept stable. Hence, in the liquid panel, a display of high contrast and large capacity can be obtained in a simple matrix arrangement of only the electrodes without the need for providing a non-linear element at each pixel as in a thin-film transistor.

However, since the ferroelectric liquid crystal can assume a stable state restrictively as shown in FIGS. 11a to 11c, it is extremely difficult to achieve a number of gradations. The state of gray display of FIG. 11c is stable only in a narrow voltage region in which the state of FIG. 11a changes to the state of FIG. 11b. Thus, it is difficult to obtain a uniform intermediate gradation due to uniformity of the liquid crystal panel, etc.

Therefore, a prior art ferroelectric liquid crystal panel usually employs a binary display basically so as to obtain gradation through a plurality of pixels and a plurality of scannings as proposed, for example, by T. Leroux, F. Baume et al. in 1988 INTERNATIONAL DISPLAY RESEARCH CONFERENCE, p111-113. In this method, each of a scanning electrode and a signal electrode, which constitute each pixel, is required to be provided with one drive circuit.

Meanwhile, several methods are proposed in which the display of gradation is performed without increasing the number of the drive circuits. For example, in a method, the liquid crystal response threshold is changed by providing a region in which thickness of a liquid crystal layer varies in one pixel as proposed by Y. Iwai et al. in the Digest of 13th Liquid Crystal Conference (1987), p138-139. Meanwhile, in another method, an intermediate voltage is applied to an subelectrode by dividing a range between a voltage and a ground potential through a resistance element. Especially, regarding the latter method, a concrete example is reported in Japanese Laid-Open Patent Publication No. 63-316024 in which the main electrode and the subelectrode connected to a power source are connected by a resistance of 500 $\Omega$ and the subelectrode and the ground electrode are connected by a resistance of 500 $\Omega$. However, this method has drawbacks in that the power consumption is quite large and stability of liquid crystal on the subelectrode is low. This is partly because in many drive methods, a positive or negative potential is applied to the sides of the scanning electrode and the signal electrode substantially at all times and thus, a rather large amount of current flows through the resistances substantially at all times. Furthermore, this may be partly because the subelectrode is grounded by the low resistance, so that drop of stability of the liquid crystal on the subelectrode is greatly influenced by nonselected pulses, thereby resulting in an unstable memory state.

SUMMARY OF THE INVENTION

Accordingly, an essential object of the present invention is to provide an optical modulation element which is capable of displaying gradations stably by a single scanning with small power consumption without the need for increasing the number of pixels.

In order to accomplish this object of the present invention, an optical modulation element embodying the present invention comprises: a plurality of n common electrodes, wherein n denotes an integer of 2 or more; m subelectrodes which are electrically connected to each of the common electrodes by electrical elements, wherein m denotes an integer of 1 or more; and a plurality of segment electrodes which confront the common electrodes and the subelectrodes; wherein when a first one of the m subelectrodes is electrically connected to an i-th one of the common electrodes, wherein i denotes an integer from 1 to n, an m-th one of the m subelectrodes is electrically connected to one of the common electrodes other than the i-th one of the common electrodes.

By the above described arrangement of the present invention, the voltage applied to the subelectrodes is made lower than that applied to the common electrodes through a voltage division or voltage delay caused by the electrical elements. Thus, by combining the response of the pixels on the subelectrodes and the response of the pixels on the common electrodes, a clear and stable display of gradations can be performed. Meanwhile, when the number of subelectrodes connected to each common electrode by the electrical elements is increased, more gradations can be displayed.

Thus, in the present invention, the subelectrodes are connected to the common electrodes by the electrical elements. Therefore, the present invention provides an optical modulation element of simple matrix type in which stable display of gradations can be performed by a single scanning with substantially no increase of power consumption and without increasing the number of drive circuits.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
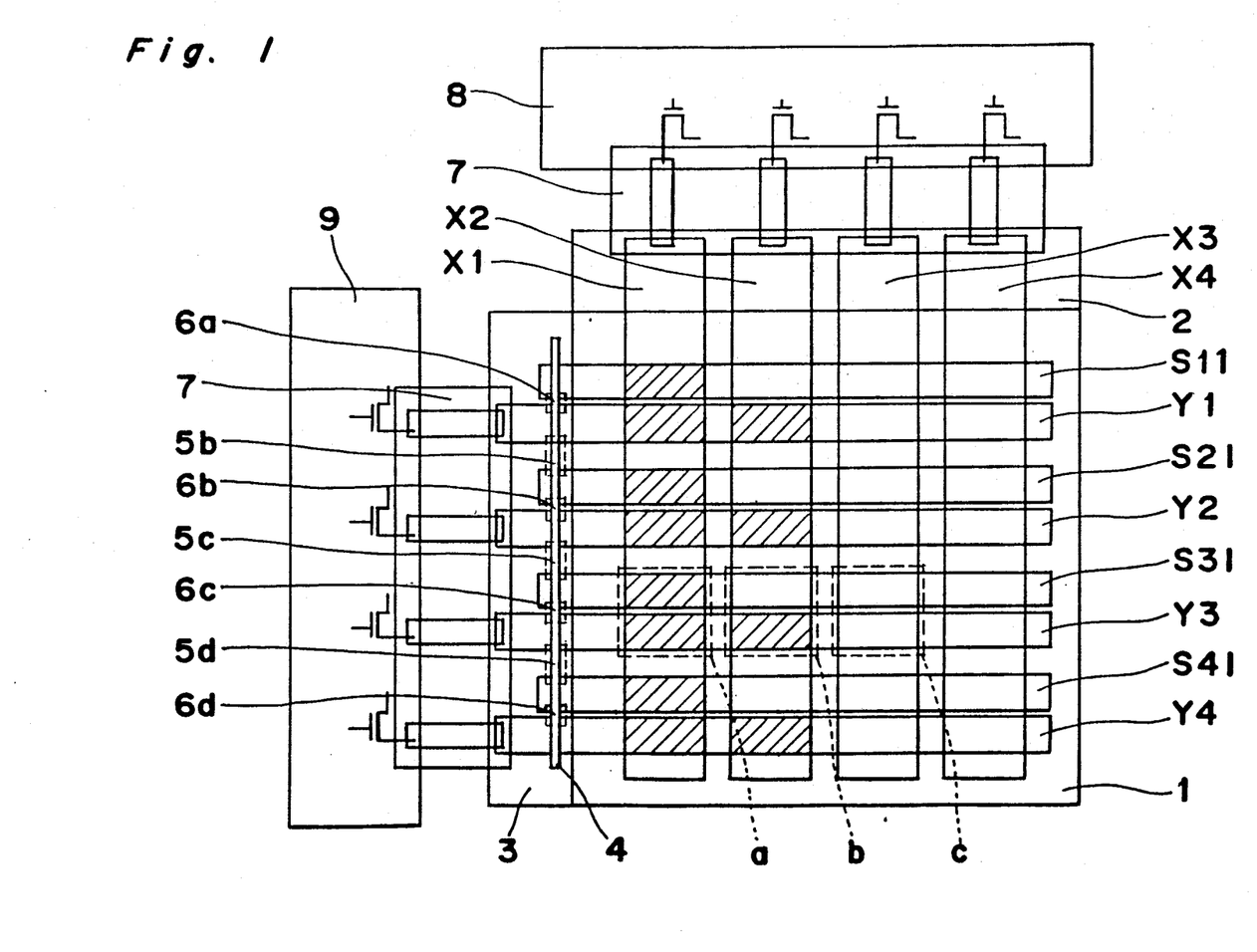
FIG. 1 is a top plan view of an optical modulation element according to a first embodiment of the present invention.

Referring now to the drawings, there is shown in FIG. 1, a liquid crystal panel 1 acting as an optical modulation element according to a first embodiment of the present invention. The liquid crystal panel 1 is constituted by an upper substrate 2, a lower substrate 3 and a liquid crystal layer interposed between the upper and lower substrates 2 and 3. Each of the upper and lower substrates 2 and 3 includes an electrically conductive thin film formed with an electrode pattern. Segment electrodes X1 to X4 are provided on the upper substrate 2, while common electrodes Y1 to Y4 and subelectrodes S11 to S41 are provided on the lower substrate 3. In this embodiment, the number n of the common electrodes is set to 4, while the number m of the subelectrodes used for each common electrode is set to 1.

Figure 1A:
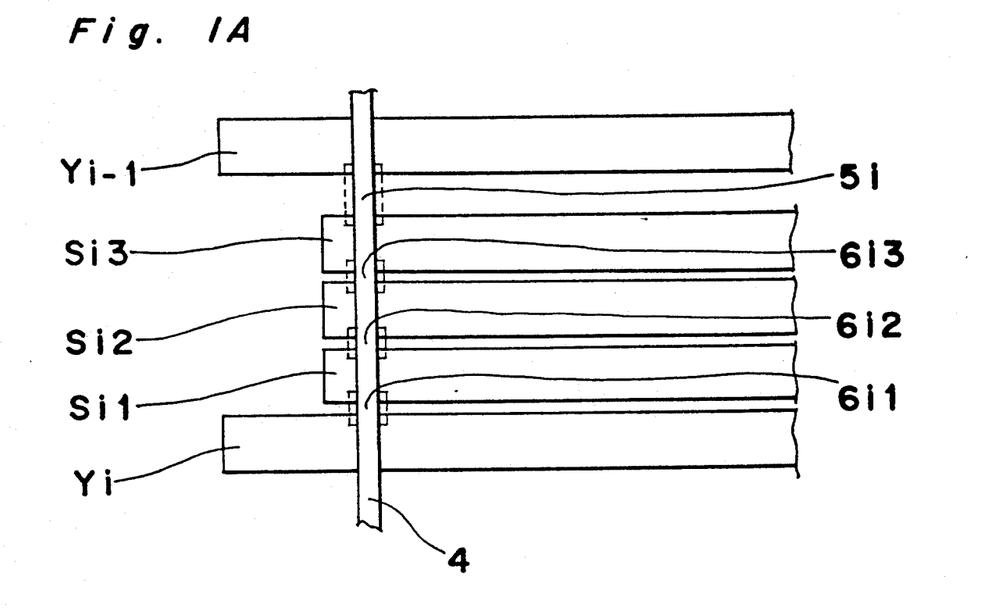
FIG. 1A is a fragmentary top plan view of one example of the optical modulation element of FIG. 1.

If the number m is 2 or more, numerals 1, 2, 3, - - - are sequentially allotted to the subelectrodes in increasing order of distance from each corresponding common electrode. For example, in the case where the number m is 3, subelectrodes Si1 to Si3 ($1 \leq i \leq n$) are connected between neighboring common electrodes $Y_i$ and $Y_{i-1}$ by resistors 6i1 to 6i3 and 5i as shown in FIG. 1A. Thus, the subelectrode Si1 is connected to the common electrode $Y_i$ by the resistor 6i1, while the subelectrode Si3 is connected to the common electrode $Y_{i-1}$ by the resistor 5i. Among the resistors 6i1 to 6i3 and 5i between the common electrodes $Y_i$ and $Y_{i-1}$, the resistor 5i connecting the subelectrode Si3 and the common electrode $Y_{i-1}$ has a maximum impedance.

The segment electrodes X1 to X4 are connected to a signal voltage circuit by a flexible substrate 7. The common electrodes Y1 to Y4 are connected to a scanning voltage circuit by the flexible substrate 7. Resistive paste 4 is coated linearly on the common electrodes Y1 to Y4 and the subelectrodes S11 to S41 so as to be printed. In this case, since only portions between the common electrodes Y1 to Y4 and the subelectrodes S11 to S41, in which the electrically conductive thin film is not present, act as resistors, these regions are, respectively, regarded as resistors 5b to 5d and 6a to 6d for convenience's sake. Each of the subelectrodes S11 to S41 is electrically connected to opposite neighboring common electrodes Y1 to Y4 by the resistors 5b to 5d and 6a to 6d.

Figure 2:
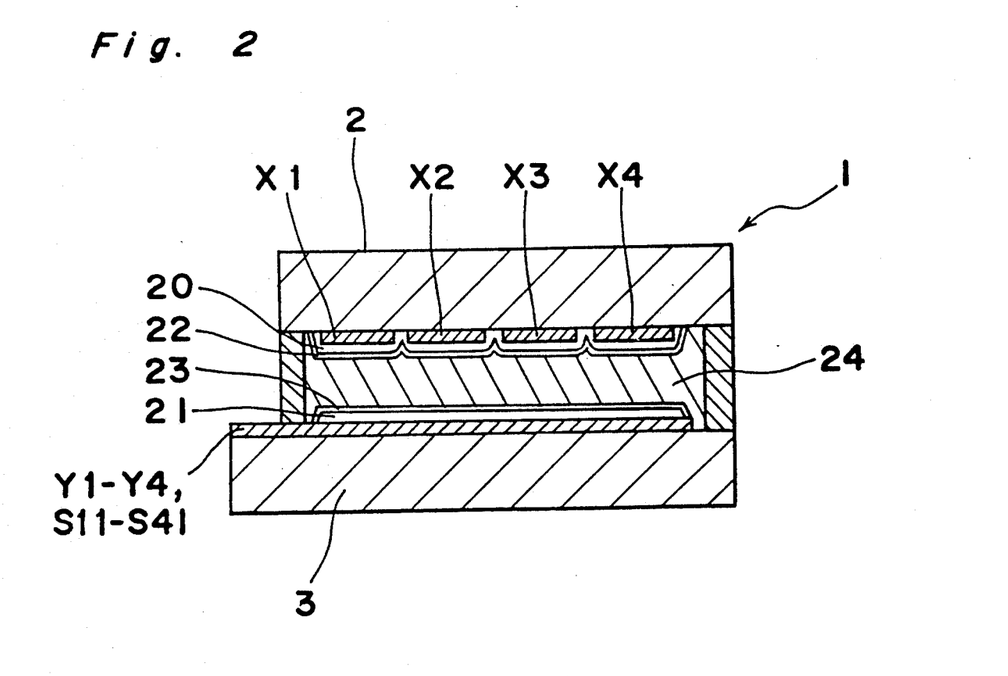
FIG. 2 is a sectional view of the optical modulation element of FIG. 1.

FIG. 2 shows the liquid crystal panel 1. An overcoat 20 for preventing dielectric breakdown is provided on the segment electrodes X1 to X4 on the upper electrode 2. Likewise, an overcoat 21 for preventing dielectric breakdown is provided on the common electrodes Y1 to Y4 on the lower substrate 3. Furthermore, alignment layers 22 and 23 formed by oblique deposition of SiO are, respectively, provided on the overcoats 20 and 21. A ferroelectric liquid crystal 24 of the ester series, which exhibits a chiral smetic-C phase, is interposed between the alignment layers 22 and 23.

In patterning of the electrodes in this embodiment, a distance of a gap between the common electrode and the subelectrode for the resistors 5b to 5d and that for the resistors 6a to 6d are set to a ratio of 5 to 1 such that the resistors 5b to 5d and the resistors 6a to 6d have resistances of 10 kΩ and 2 kΩ, respectively. Meanwhile, the coated resistors are printed so as to have a fixed width. Thus, the resistors 5b to 5d having a resistance of 10 kΩ and the resistors 6a to 6d having a resistance of 2 kΩ can be obtained relatively easily. Meanwhile, even if width and thickness of the resistors are partially nonuniform, the resistance value at the region changes uniformly, so that the ratio of the resistance values of 5 to 1, which determines divisional ratio of voltage, can be obtained substantially positively, thereby offering no problem for driving the liquid crystal panel 1. In the case where transfer procedure from a film is employed in place of printing in order to form the resistors, the same excellent effects as those of printing can be achieved. Although not specifically shown, also when a method in which a resistor is coated on a flexible substrate so as to be printed or a method in which a resistor is formed on a circuit board are employed in addition to the substrates of the liquid crystal panel 1, the same effects can be obtained.

Meanwhile, the ITO electrically conductive thin film used for the electrodes for the substrates is a resistor itself. Thus, the resistors can be formed by producing an extremely thin pattern of the electrically conductive thin film simultaneously with etching a pattern of the electrodes. At this time, by controlling width and length of the electrically conductive thin film acting as the resistors, proper resistances can be imparted to the resistors and display of gradations can be performed as in the above embodiment.

The resistance value of the resistors 6a to 6d is determined by the value of capacity of the liquid crystal layer and is based on such a condition that charging and discharging periods of the liquid crystal layer are sufficiently short, namely, the resistance value is sufficiently small. A limit at which influence of charging and discharging periods of the liquid crystal layer is negligible corresponds substantially to a case in which the resistors 6a to 6d assume a resistance value of 10 kΩ. In this embodiment, the resistance value of the resistors 6a to 6d is set to 2 kΩ conservatively. Meanwhile, the resistance value of the resistors 5b to 5d is determined by the resistance value of the resistors 6a to 6d and a desired divisional ratio of voltage. By adjusting the divisional ratio of voltage, gradations can be displayed properly. In this embodiment, the divisional ratio of voltage of 5 to 1 is optimum.

Figure 3A:
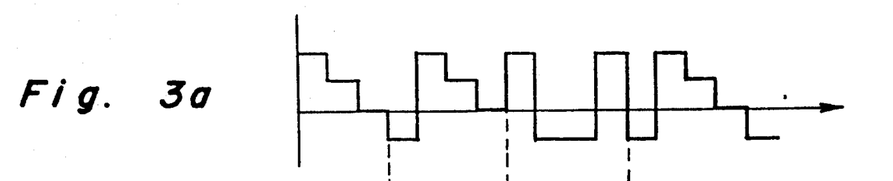
FIGS. 3a to 3c are diagrams showing drive waveforms applied to common electrodes in the optical modulation element of FIG. 1.
Figure 3B:
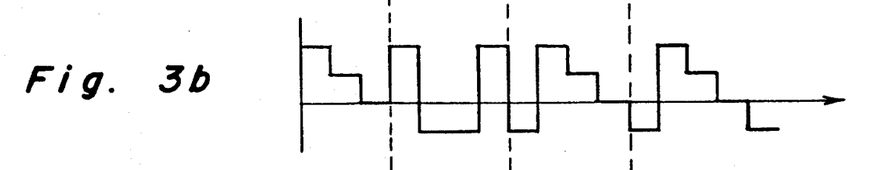
Figure 3C:
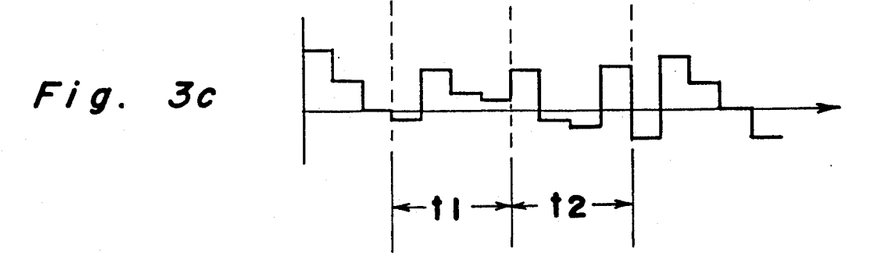

In this embodiment, a 4-pulse method having quiescent phase is employed. However, this method is not necessarily essential for the present invention and thus, an ordinary 4-pulse method or 2-pulses method may be employed for driving the liquid crystal panel 1 without any problem. Hereinbelow, this 4-pulse method having a quiescent phase is described. FIGS. 3a to 3c show examples of drive waveforms applied to the common electrodes. When a scanning waveform of FIG. 3a is applied to the common electrode Y3, writing is performed for the liquid crystal on the common electrode Y3 during a selected period t2. In this case, the waveform of FIG. 3b is applied to the common electrode Y2 which has been selected during a period t1 preceding the selected period t2. A nonselected waveform is applied to the common electrode Y2 during the period t2. In the case where the above described voltage waveforms are applied to the common electrodes Y3 and Y2, a waveform obtained by effecting voltage division at a ratio of 5 to 1 between the waveforms of FIGS. 3a and 3b, namely the waveform of FIG. 3c is applied to the subelectrode S31. In this case, a selected waveform of a total of 8 pulses is applied to the subelectrode S21 during the periods t1 and t2. In order to drive the subelectrode S31 simultaneously with the common electrode Y3, the selected pulse during the period t2 should have a value relatively similar to that of the common electrodes Y2 and Y3. Also for this reason, the resistance value of the resistors 5b to 5d are required to be larger than that of the resistors 6a to 6d. Otherwise, the subelectrode S31 will be driven in dependence upon the common electrode Y2. However, in this case, since a voltage of the selected pulse, which is low but is higher than a voltage of the nonselected pulse, is applied to the subelectrode S31 immediately after writing on the subelectrode S31, stability of writing on the subelectrode S31 deteriorates slightly. Therefore, it is desirable that the subelectrode S31 be driven in dependence upon the common electrode Y3.

Figure 4A:
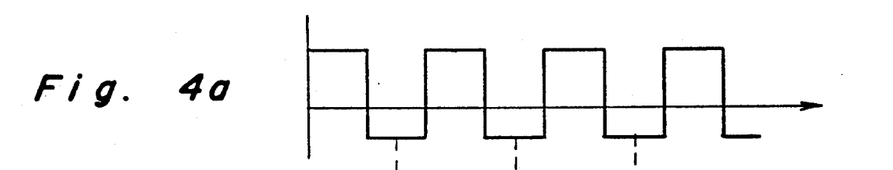
FIGS. 4a to 4c are diagrams showing drive waveforms applied to segment electrodes in the optical modulation element of FIG. 1.
Figure 4B:
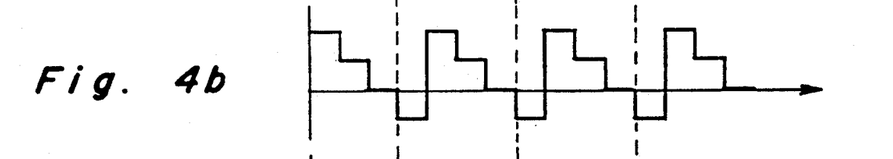
Figure 4C:
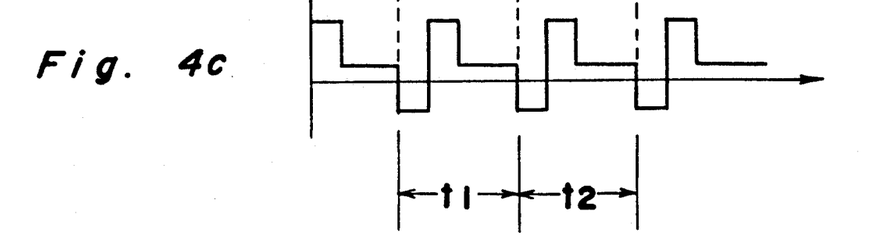

FIGS. 4a to 4c show examples of voltage pulses applied to the segment electrodes. The voltage pulses are required to be outputted at a number of intermediate levels corresponding to the number of the subelectrodes. In this embodiment, since one subelectrode is provided for each common electrode, achievable gradations are of 3 values in which (1) both the common electrode and the subelectrode are in the OFF state, (2) only the common electrode in the OFF state and (3) both the common electrode and the subelectrode are in the ON state. Thus, the 3-value signal is applied to the segment electrodes. In FIGS. 4a to 4c, the liquid crystal of the segment electrodes X1, X2 and X3 is in the ON state, the gray state and the OFF state, respectively. In FIG. 1, the hatched portions illustrate areas of liquid crystal in the ON state. The signal waveforms shown in FIGS. 4a to 4c are, respectively, applied to the segment electrodes X1 to X3, respectively. This represents a voltage modulation type drive method in which the gray waveform of FIG. 4b assumes voltage intermediate between the ON waveform of FIG. 4a and the OFF waveform of FIG. 4c. However, this voltage modulation type drive method may be replaced by a pulse width modulation type drive method.

Figure 5A:
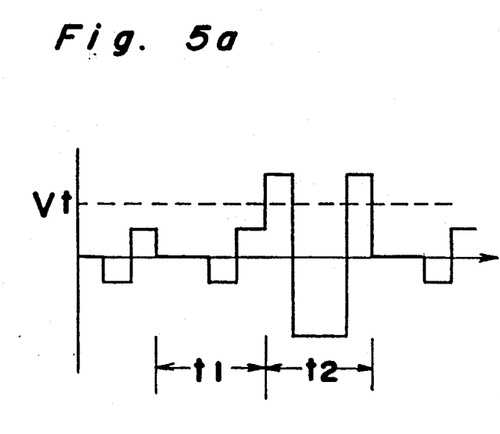
FIGS. 5a to 5f are diagrams showing voltage waveforms applied to each pixel in the optical modulation elements according to the first and second embodiment of the present invention.
Figure 5B:
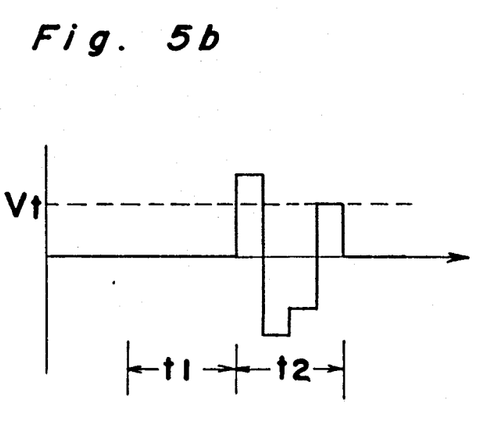
Figure 5C:
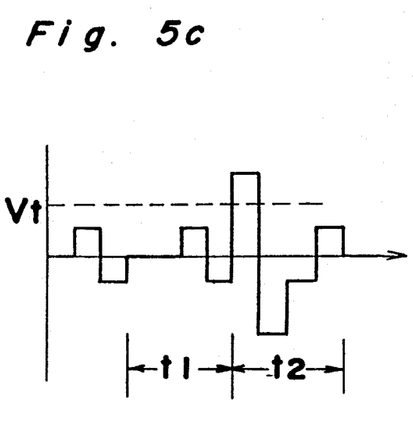
Figure 5D:
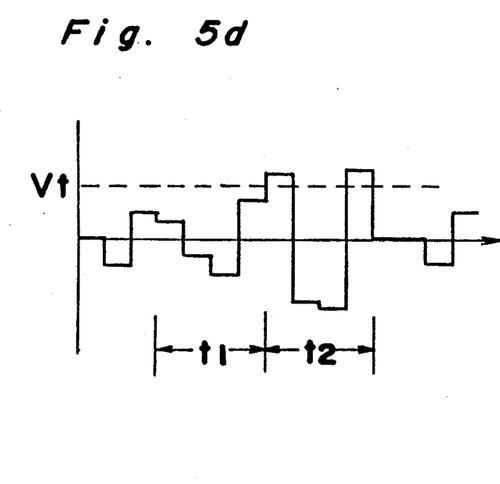
Figure 5E:
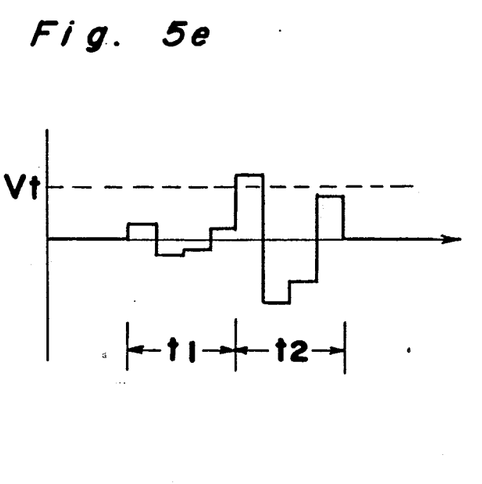
Figure 5F:
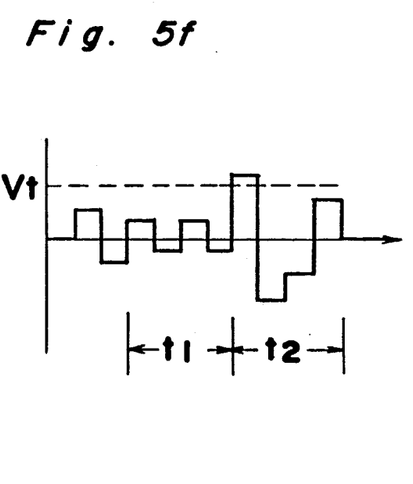

When the drive waveforms of FIGS. 3a–3c and 4a–4c are applied to the common electrodes and the segment electrodes, the waveform applied to each pixel is determined by the difference between the wave form of FIGS. 3a–3c and the wave form of FIGS. 4a–4c as shown in FIGS. 5a to 5f. FIGS. 5a to 5c show waveforms of voltage pulses applied between the common electrode Y3 and each of the segment electrodes X1 to X3, respectively. On the other hand, FIGS. 5d to 5f show voltages applied between the subelectrode S31 and each of the segment electrodes X1 to X3, respectively. In this embodiment, a 4-pulse method having quiescent phase is employed in which writing pulses are constituted by 4 positive or negative pulses. In the 4 pulses, the first two pulses function to reset pixels have a fixed magnitude regardless of data to be written. Meanwhile, the last two pulses arranged to effect writing of pixels and magnitude of the last two pulses varies according to data to be written. It is well known that response of a ferroelectric liquid crystal has sharp threshold characteristics. When magnitude of the last two pulses exceeds this threshold, the writing of pixels is performed. In FIGS. 5a–5f, the response threshold of the ferroelectric liquid crystal is indicated by a voltage Vt. When a writing pulse voltage exceeds the threshold Vt, the hatched regions in FIG. 1 respond and thus, a 3-value display of the ON state, gray state and OFF state can be performed at pixels a, b and c, respectively.

Meanwhile, as shown by the periods, t1 and t2 in FIGS. 5d to 5f, the writing pulse applied to the liquid crystal on the subelectrode S31 is constituted by 8 pulses. Thus, as compared with a case in which the liquid crystal on the subelectrodes is driven by only 4 pulses, the drive margin of liquid crystal on the subelectrodes becomes wider, thereby resulting in its stable drive. However, in the 8 pulses, the first 4 pulses are influenced by the common electrodes of other stripe groups and are not essential for writing. In order to lessen this influence in this embodiment, the common electrodes are disposed, in the scanning direction, downstream of the subelectrodes which are driven in dependence upon the common electrodes, respectively. Since the pulses essential for writing are disposed at the last side of the 8 pulses, the influence of the writing data signal at the time when other common electrodes have been selected can be minimized.

Figure 6:
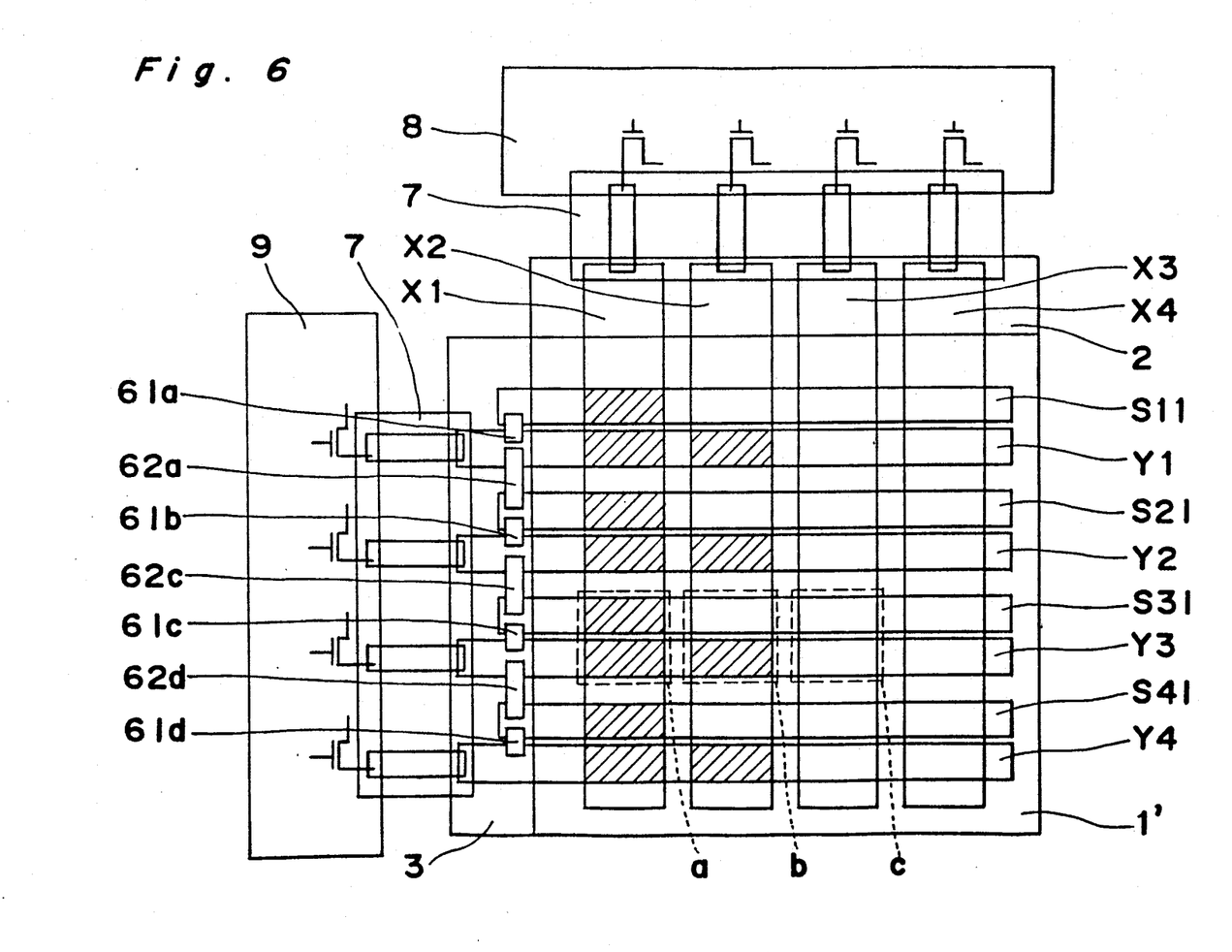
FIG. 6 is a top plan view of the optical modulation element according to the second embodiment of the present invention.

FIG. 6 shows a liquid crystal panel 1' according to a second embodiment of the present invention. In the liquid crystal panel 1', the resistors 5b to 5d and 6a to 6d of the liquid crystal panel 1 are replaced by capacitors 61a to 61d and 62b to 62d. Since other elements of the crystal panel 1' are the same as those of the liquid crystal panel 1, a description thereof has been abbreviated for the sake of brevity. FIGS. 2 to 5f apply to also the liquid crystal panel 1'. Also in the liquid crystal panel 1', the divided voltage is applied to the subelectrodes in the same manner as in the liquid crystal panel 1.

The capacitors 62b to 62d have a capacity of 1,000 pF, while the capacitors 61a to 61d have a capacity of 5,000 pF. The capacity of the capacitors 61a to 61d is determined by the capacity of the liquid crystal layer. If the capacity of the capacitor 61a to 61d is small, the influence of a circuit leading to a signal voltage source through the capacitors of the liquid crystal layer is increased and thus, dependence upon patterns is likely to take place. This phenomenon can be prevented on the condition that the capacitors 61a to 61d have a capacity of about 1,000 pF. In this embodiment, the capacity of the capacitors 61a to 61d is set to 5,000 pF conservatively. The capacity of the capacitors 62b to 62d is determined by an inverse of the divisional ratio of voltage of 5 to 1 and the capacity of 5,000 pF of the capacitors 61a to 61d so as to assume 1,000 pF. The capacitors are formed by coating dielectric material having a high dielectric constant on the overcoats 20 and 21 (FIG. 2) for preventing dielectric breakdown. This method may be replaced by a method in which dielectric material having a high dielectric constant is formed on an electrically conductive thin film on a liquid crystal substrate and a further dielectric material is formed on the dielectric material, a method in which capacitors are coated on a flexible substrate so as to be printed and a method in which capacitors are formed on a circuit board. In these alternative methods, the same effects as those of the first method can be obtained.

Figure 7:
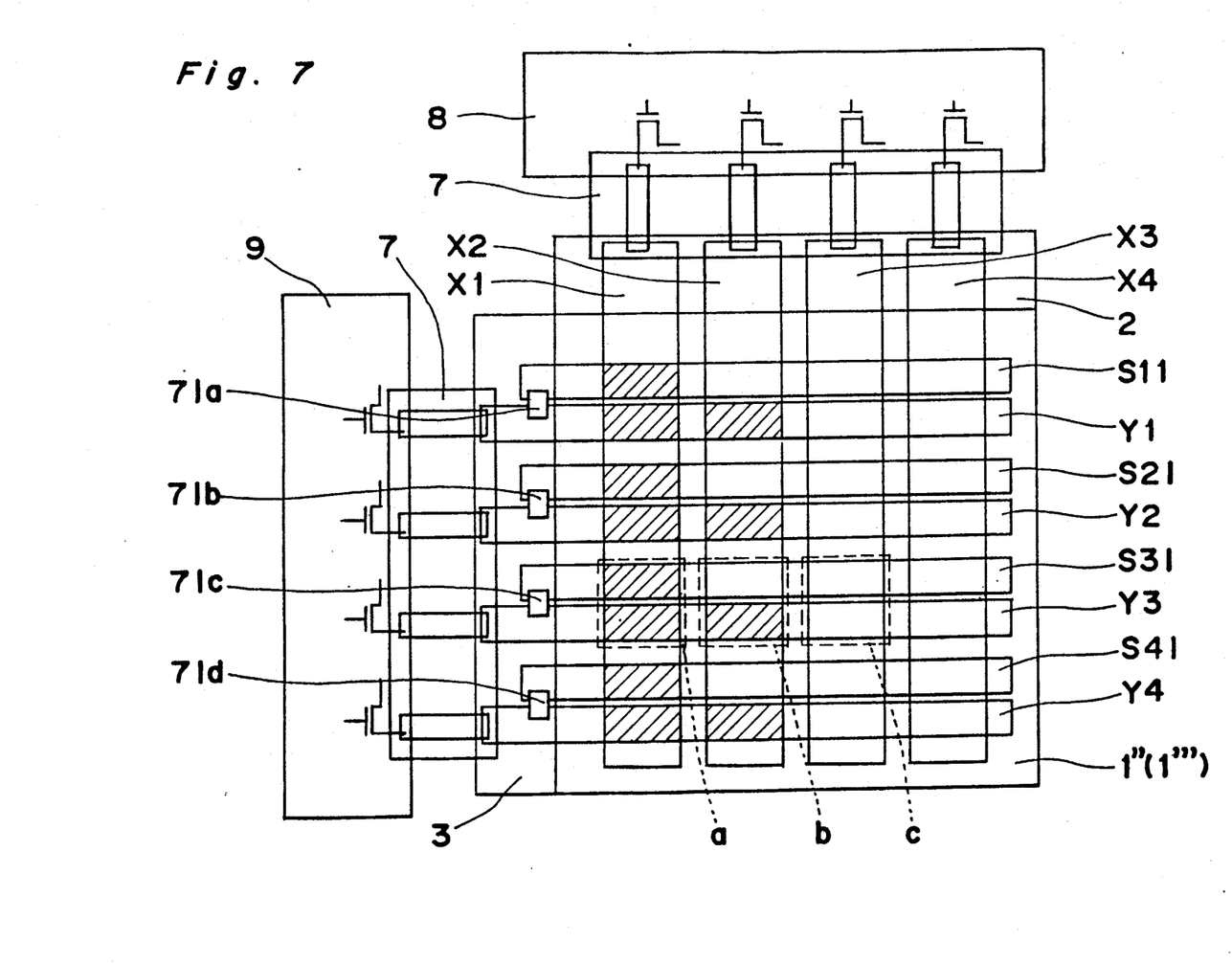
FIG. 7 is a top plan view of optical modulation elements according to third and fourth embodiments of the present invention.

FIG. 7 shows a liquid crystal panel 1" according to a third embodiment of the present invention. In the liquid crystal panel 1", each subelectrode is connected to one common electrode by each of electrical elements 71a to 71d. In this embodiment, since one subelectrode is driven in dependence upon each common electrode, the electrical elements 71a to 71d are provided. Since other constructions of the liquid crystal panel 1" are the same as those of the liquid crystal panel 1, description thereof is abbreviated for the sake of brevity. FIGS. 2 to 4c apply to also the liquid crystal panel 1". In this embodiment, the electrical elements 71a to 71d are resistors each having a resistance of 10 kΩ. At this time, voltages are applied to the pixels as shown in FIGS. 8a to 8f.

Figure 8A:
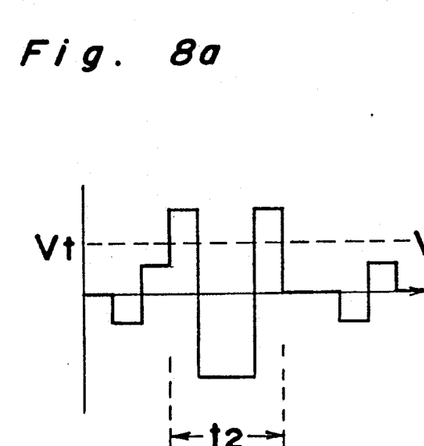
FIGS. 8a to 8f are voltage waveform diagrams of the optical modulation element according to the third embodiment of the present invention.
Figure 8B:
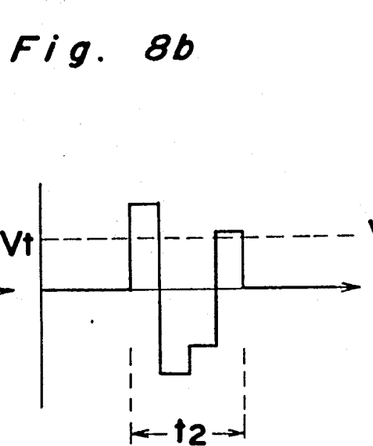
Figure 8C:
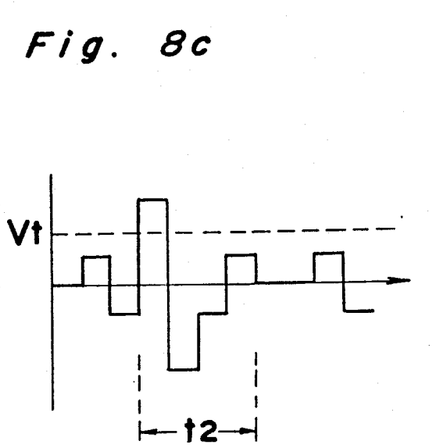
Figure 8D:
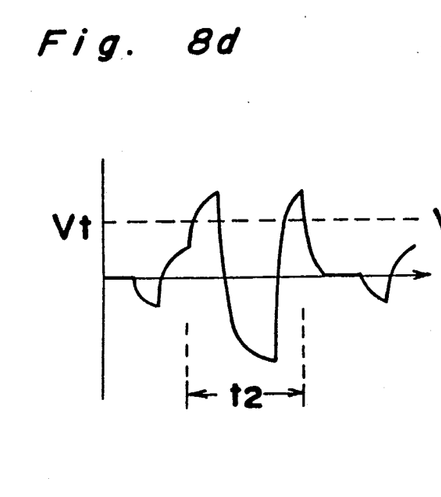
Figure 8E:
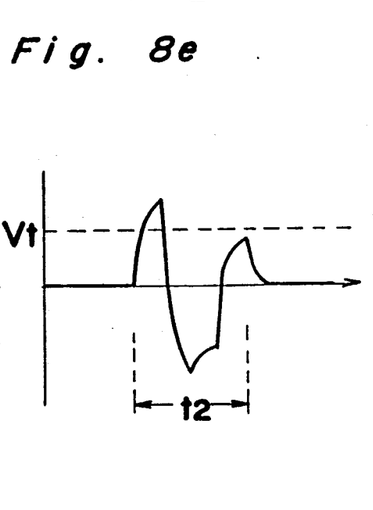
Figure 8F:
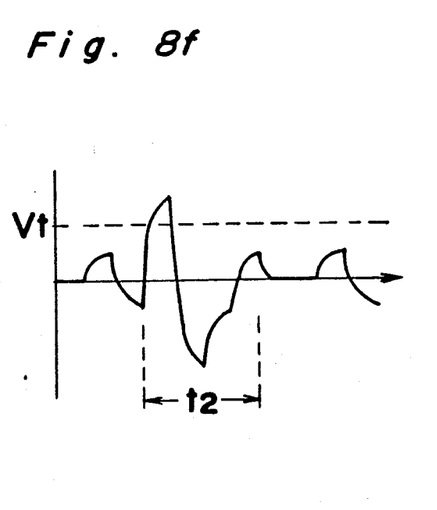

FIGS. 8a to 8c show the voltages applied between the common electrode Y3 and each of the segment electrodes X1 to X3, respectively. At this time, the voltages shown in FIGS. 8d to 8e are applied between the subelectrode S31 and each of the segment electrodes X1 to X3, respectively. The portion between the segment electrode and the common electrode or the subelectrode functions as a capacitor and charging of the capacitor is performed upon the application of the voltage pulse thereto. At this time, the charging of the capacitor on the common electrode Y3 is performed rapidly since resistance of the common electrode Y3 is negligible. However, since charging of the capacitor on the subelectrode S31 is performed through the resistor 71c, its waveform is made obtuse by the RC time constant and the voltage effectively applied to the liquid crystal layer is lessened. At this time, only regions exceeding the response threshold Vt respond. As a result, the hatched portions in FIG. 7 are turned on and the 3-value display of the ON state, gray state and OFF state is performed at the pixels a, b and c, respectively.

Figure 9A:
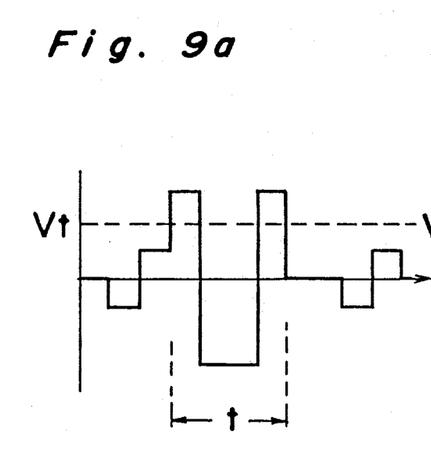
FIGS. 9a to 9f are voltage waveform diagrams of the optical modulation element according to the fourth embodiment of the present invention.
Figure 9B:
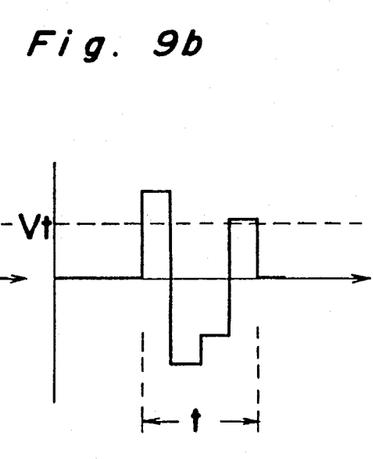
Figure 9C:
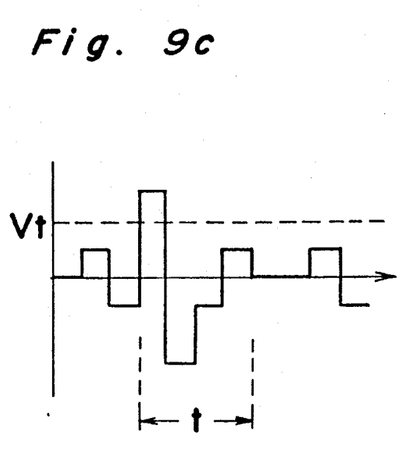
Figure 9D:
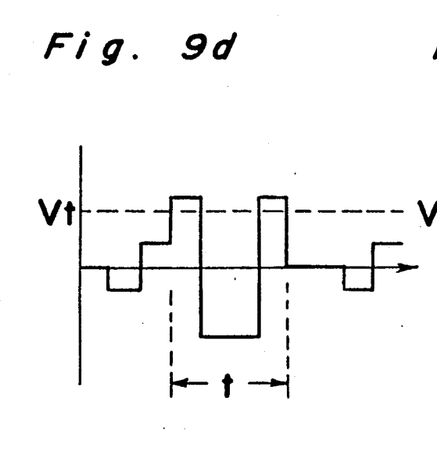
Figure 9E:
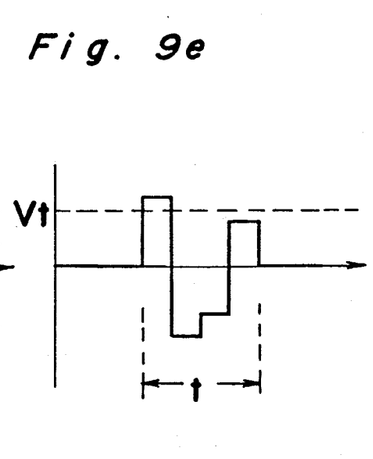
Figure 9F:
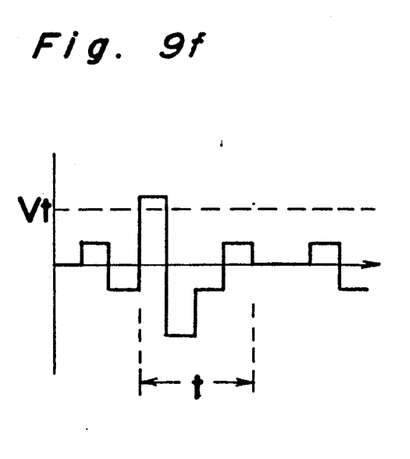

A liquid crystal panel 1''' according to a fourth embodiment of the present invention is also illustrated by FIG. 7. In the liquid crystal panel 1''', the electrical elements 71a and 71d are capacitors each having a capacity of 1,000 pF. When the drive waveforms of FIGS. 3a-3c and 4a-4c are applied to the liquid crystal panel 1''', voltages are applied to pixels as shown in FIGS. 9a to 9f. FIGS. 9a to 9c show the voltages applied between the common electrode Y3 and each of the segment electrodes X1 to X3, while FIGS. 9d to 9f show the voltages applied between the subelectrode S31 and each of the segment electrodes X1 to X3. This is because the voltage effectively applied to the liquid crystal layer is reduced due to the capacity of the liquid crystal layer and the voltage division performed by the capacitor connecting the subelectrode S31 and the common electrode Y3. Also in this embodiment, only regions exceeding the response threshold Vt respond, so that only the hatched portions in FIG. 7 respond and thus, a clear 3-value display can be performed.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as being included therein.

What is claimed is:

1. An optical modulation element comprising:
   a plurality of n common electrodes, wherein n denotes an integer of 2 or more;
   m subelectrodes which are electrically connected to each of the common electrodes by electrical elements, wherein m denotes an integer of 1 or more; and
   a plurality of segment electrodes which confront the common electrodes and the subelectrodes;
   wherein, when a first one of the m subelectrodes is electrically connected to an i-th one of the common electrodes, wherein i denotes an integer from 1 to n, an m-th one of the m subelectrodes is electrically connected to one of the common electrodes other than the i-th one of the common electrodes.

2. An optical modulation element as claimed in claim 1, wherein the m-th one of the m subelectrodes is electrically connected to an (i−1)-th one of the common electrodes.

3. An optical modulation element as claimed in claim 2, wherein one of the electrical elements which is disposed between the (i−1)-th common electrode and the i-th common electrode, and which is disposed between the (i−1)-th common electrode and the m-th subelectrode, has an impedance which is greater then that of the other electrical elements.

4. An optical modulation element as claimed in claim 1, further comprising:
a ferroelectric liquid crystal layer.

5. An optical modulation element as claimed in claim 1, wherein the electrical elements function as a means for dividing a voltage.

6. An optical modulation element as claimed in claim 1, wherein the electrical elements are resistors.

7. An optical modulation element as claimed in claim 1, wherein gaps between the common electrodes and neighboring subelectrodes have at least two kinds of distances.

8. An optical modulation element as claimed in claim 7, wherein the electrical elements comprise printed elements.

9. An optical modulation element as claimed in claim 1, wherein the electrical elements are capacitors.

10. An optical modulation element as claimed in claim 9, wherein the capacitors comprise printed capacitors.

11. An optical modulation element as claimed in claim 1, wherein the electrical elements are disposed on a substrate on which the subelectrodes are disposed.

12. An optical modulation element as claimed in claim 11, wherein the electrical elements are at least partially made of a material identical with that of the subelectrodes.

13. An optical modulation element as claimed in claim 1, wherein the electrical elements are disposed on a circuit board connected to a substrate on which the common electrodes and the subelectrodes are disposed.

14. An optical modulation element as claimed in claim 1, wherein the electrical elements are disposed on a flexible substrate connected to a substrate on which the common electrodes and the subelectrodes are disposed.

15. An optical modulation element comprising:
a plurality of common electrodes;
m subelectrodes which are electrically connected to each of the common electrodes by electrical elements, wherein m denotes an integer of 1 or more;
a plurality of segment electrodes which confront the common electrodes and the subelectrodes; and
a liquid crystal layer, disposed on both the common electrodes and subelectrodes and having a substantially uniform thickness;
wherein none of the common electrodes, the subelectrodes and the segment electrodes are connected to a fixed voltage.

16. An optical modulation element as claimed in claim 15, wherein said liquid crystal layer is
a ferroelectric liquid crystal layer.

17. An optical modulation element as claimed in claim 15, wherein the electrical elements function as a means for dividing a voltage.

18. An optical modulation element as claimed in claim 15, wherein the electrical elements function as a means for effecting a signal delay.

19. An optical modulation element as claimed in claim 15, wherein the electrical elements are resistors.

20. An optical modulation element as claimed in claim 19, wherein gaps between the common electrodes and neighboring subelectrodes have at least two kinds of distances.

21. An optical modulation element as claimed in claim 19, wherein the electrical elements comprise printed elements.

22. An optical modulation element as claimed in claim 15, wherein the electrical elements are capacitors.

23. An optical modulation element as claimed in claim 22, wherein the electrical elements comprise printed elements.

24. An optical modulation element as claimed in claim 15, wherein the electrical elements are disposed on a substrate on which the subelectrodes are disposed.

25. An optical modulation element as claimed in claim 24, wherein the electrical elements are at least partially made of a material identical with that of the subelectrodes.

26. An optical modulation element as claimed in claim 15, wherein the electrical elements are disposed on a circuit board connected to a substrate on which the common electrodes and the subelectrodes are disposed.

27. An optical modulation element as claimed in claim 15, wherein the electrical elements are disposed on a flexible substrate connected to a substrate on which the common electrodes and the subelectrodes are disposed.

* * * * *